(12) United States Patent
Hennig

(10) Patent No.: US 8,203,230 B2
(45) Date of Patent: Jun. 19, 2012

(54) YAW BEARING SYSTEM

(75) Inventor: Jens Hennig, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/826,036

(22) Filed: Jun. 29, 2010

(65) Prior Publication Data

US 2011/0316286 A1 Dec. 29, 2011

(51) Int. Cl.
F03D 9/00 (2006.01)
H02P 9/04 (2006.01)

(52) U.S. Cl. .......................................... 290/55; 290/44

(58) Field of Classification Search ................. 290/44, 290/55
See application file for complete search history.

(56) References Cited

U.S. PATENT DOCUMENTS

| | | | | |
|---|---|---|---|---|
| 4,353,681 A * | 10/1982 | Doman | ........................... | 416/11 |
| 4,515,525 A * | 5/1985 | Doman | ........................... | 416/11 |
| 4,557,666 A * | 12/1985 | Baskin et al. | ................... | 416/32 |
| 4,565,929 A * | 1/1986 | Baskin et al. | ................... | 290/44 |
| 7,075,192 B2 * | 7/2006 | Bywaters et al. | ............... | 290/55 |
| 7,095,129 B2 * | 8/2006 | Moroz | ............................ | 290/44 |
| 7,109,600 B1 * | 9/2006 | Bywaters et al. | ............... | 290/55 |
| 7,119,453 B2 * | 10/2006 | Bywaters et al. | ............... | 290/55 |
| 7,175,389 B2 * | 2/2007 | Moroz | ............................. | 416/1 |
| 7,550,863 B2 * | 6/2009 | Versteegh | ....................... | 290/44 |
| 7,608,939 B2 * | 10/2009 | Bagepalli et al. | .............. | 290/55 |
| 7,821,148 B2 * | 10/2010 | Piasecki et al. | ................. | 290/44 |
| 7,828,686 B2 * | 11/2010 | Aiyakkannu | ................. | 475/221 |
| 7,895,016 B2 * | 2/2011 | Vittal et al. | ..................... | 702/184 |
| 7,939,961 B1 * | 5/2011 | Bonnet | ............................ | 290/55 |
| 2004/0096329 A1 * | 5/2004 | Engstrom | ................. | 416/132 B |
| 2006/0152015 A1 * | 7/2006 | Bywaters et al. | .............. | 290/55 |
| 2006/0152016 A1 * | 7/2006 | Bywaters et al. | .............. | 290/55 |
| 2007/0057516 A1 * | 3/2007 | Mever et al. | ..................... | 290/44 |
| 2008/0150292 A1 * | 6/2008 | Fedor et al. | ..................... | 290/55 |
| 2008/0164700 A1 * | 7/2008 | Bagepalli et al. | .............. | 290/55 |
| 2008/0272604 A1 * | 11/2008 | Versteegh | ....................... | 290/55 |
| 2009/0148286 A1 * | 6/2009 | Kammer et al. | ................ | 416/31 |
| 2009/0167023 A1 * | 7/2009 | Nies | ..................... | 290/55 |
| 2009/0232659 A1 * | 9/2009 | Schiffer et al. | ........... | 416/244 R |
| 2009/0257697 A1 * | 10/2009 | Andersen | ...................... | 384/455 |
| 2010/0007149 A1 * | 1/2010 | Willey | ............................ | 290/55 |
| 2010/0092292 A1 * | 4/2010 | Nies et al. | ....................... | 416/41 |
| 2010/0117372 A1 * | 5/2010 | Mcmaster | ....................... | 290/55 |
| 2010/0119370 A1 * | 5/2010 | Myhr | .............................. | 416/39 |
| 2010/0133828 A1 * | 6/2010 | Stegemann et al. | ............. | 290/44 |
| 2010/0133830 A1 * | 6/2010 | Loh et al. | ........................ | 290/44 |
| 2010/0133848 A1 * | 6/2010 | Piasecki | ......................... | 290/55 |
| 2010/0135821 A1 * | 6/2010 | Bagepalli et al. | ......... | 416/244 R |
| 2010/0138267 A1 * | 6/2010 | Vittal et al. | ....................... | 705/8 |

(Continued)

OTHER PUBLICATIONS

Growian, History of the former windenergy converter; 1997.

*Primary Examiner* — Pedro J Cuevas
(74) *Attorney, Agent, or Firm* — Global Patent Operation; Douglas D. Zhang

(57) ABSTRACT

A wind energy system is provided, with the wind energy system having a tower; a machine nacelle; a lower yaw bearing; and an upper yaw bearing; the lower yaw bearing and the upper yaw bearing being arranged to pivotably connect the machine nacelle to the tower of the wind energy system. Further, a yaw bearing system for use in a wind energy system and a method for operating a wind energy system are provided.

17 Claims, 7 Drawing Sheets

U.S. PATENT DOCUMENTS

| | | | |
|---|---|---|---|
| 2010/0140936 A1* | 6/2010 | Benito et al. | 290/44 |
| 2010/0140948 A1* | 6/2010 | Segovia et al. | 290/55 |
| 2010/0144483 A1* | 6/2010 | Aiyakkannu | 475/225 |
| 2010/0181769 A1* | 7/2010 | Altemark et al. | 290/44 |
| 2010/0320770 A1* | 12/2010 | Dahlhaug | 290/55 |
| 2011/0006541 A1* | 1/2011 | Frederiksen | 290/55 |
| 2011/0018269 A1* | 1/2011 | Moser et al. | 290/44 |
| 2011/0057451 A1* | 3/2011 | Volmer et al. | 290/55 |
| 2011/0101699 A1* | 5/2011 | Segovia et al. | 290/55 |
| 2011/0133455 A1* | 6/2011 | Altenschulte et al. | 290/44 |
| 2011/0133472 A1* | 6/2011 | Middendorf | 290/55 |
| 2011/0133473 A1* | 6/2011 | Signore et al. | 290/55 |
| 2011/0140425 A1* | 6/2011 | Staedler | 290/44 |
| 2011/0140439 A1* | 6/2011 | Ramanujam | 290/55 |
| 2011/0140442 A1* | 6/2011 | Daniels et al. | 290/55 |
| 2011/0140448 A1* | 6/2011 | Takeuchi et al. | 290/55 |

* cited by examiner

YAW BEARING SYSTEM

BACKGROUND OF THE INVENTION

The present disclosure relates to a wind energy system and a yaw bearing system for a wind energy system.

Forces and moments from a drive train of a wind energy system to the tower of the wind energy system are guided by a large yaw bearing. The yaw bearing is usually one large wheel with teeth pointing outwards or inwards depending on the location of the yaw drive. The yaw drive is used to orientate the machine nacelle with the drive train relative to the tower.

Wind energy systems have a nacelle with a bed plate fixed therein. The bed plate is connected to the yaw bearing. Current bed plate designs could possibly identify fatigue problems, especially near the yaw bearing where the forces and the moments have a maximum. Higher warranty costs and lower customer satisfaction are possible consequences. Thus, the connection of the nacelle to the tower of the wind energy system should be improved to reduce fatigue problems, especially with future lager wind turbines.

BRIEF DESCRIPTION OF THE INVENTION

In view of the above, a wind energy system is provided, with the wind energy system having a tower; a machine nacelle; a lower yaw bearing; and an upper yaw bearing; the lower yaw bearing and the upper yaw bearing being arranged to pivotably connect said machine nacelle to the tower of the wind energy system.

According to another aspect, a yaw bearing system for use in a wind energy system is provided, with the yaw bearing system having a lower yaw bearing; an upper yaw bearing, the lower yaw bearing and the upper yaw bearing being adapted to pivotably connect a nacelle to a tower of the wind energy system.

According to a further aspect, a wind energy system is provided, with the wind energy system having a tower; a machine nacelle; and a hub, wherein the hub is rotatably fixed with respect to the machine nacelle; and the tower and the machine nacelle being connected by at least two yaw bearings, wherein one of the yaw bearings is located higher than an axis of rotation of the hub of the wind energy system According to a further aspect, a method for operating a wind energy system with a nacelle and a tower is provided, the nacelle and the tower being connected by at least two yaw bearings, the method including the step of rotating the at least two yaw bearings to orientate said nacelle relatively to the tower.

Further aspects, advantages, details and features that can be combined with embodiments described herein are apparent from the dependent claims, the description and the accompanying drawings.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Figure 1:
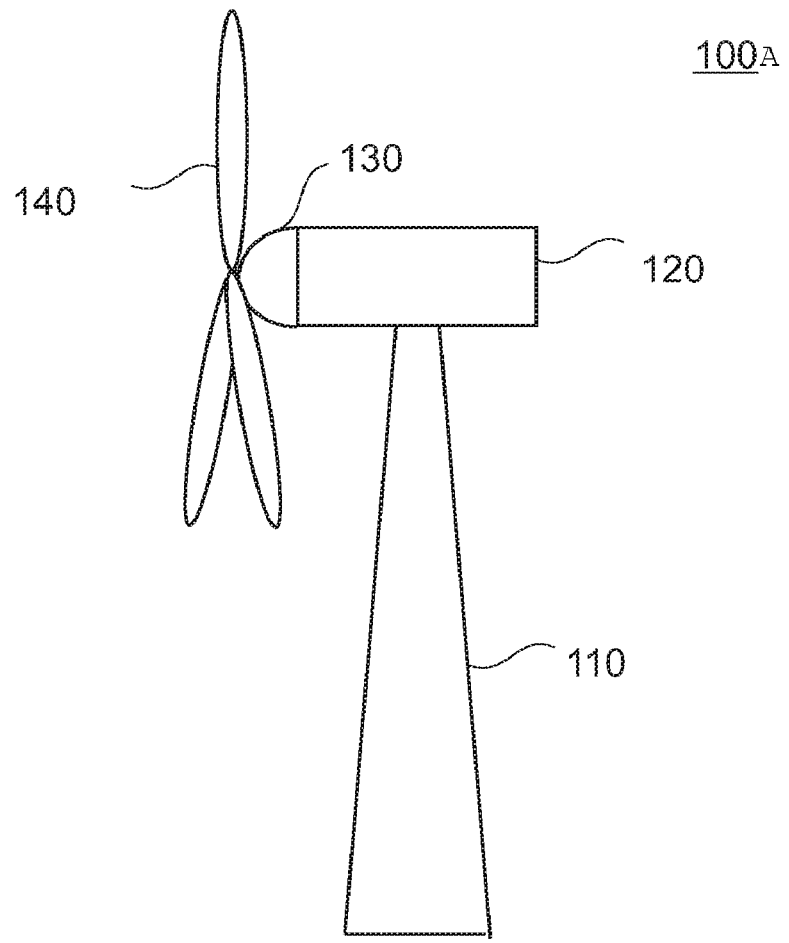
FIG. 1 is a schematic view of a wind energy system.

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Within the following description of the drawings, the same reference numbers refer to the same components. Generally, only the differences with respect to the individual embodiments are described. The structures shown in the drawings are not depicted true to scale but rather serve only for the better understanding of the embodiments.

FIG. 1 is a schematic view of a wind energy system 100A, also referred to as a wind turbine. The wind energy system 100A includes a tower 110 with a machine nacelle 120 mounted at its top end. A hub 130 having three rotor blades 140 is mounted thereto.

The hub 130 is mounted on a lateral end of the machine nacelle 120. The hub may generally be connected to a generator (not shown) located inside the machine nacelle 120 of the wind energy system 100. The hub is typically rotatable about a horizontal axis.

Figure 2:
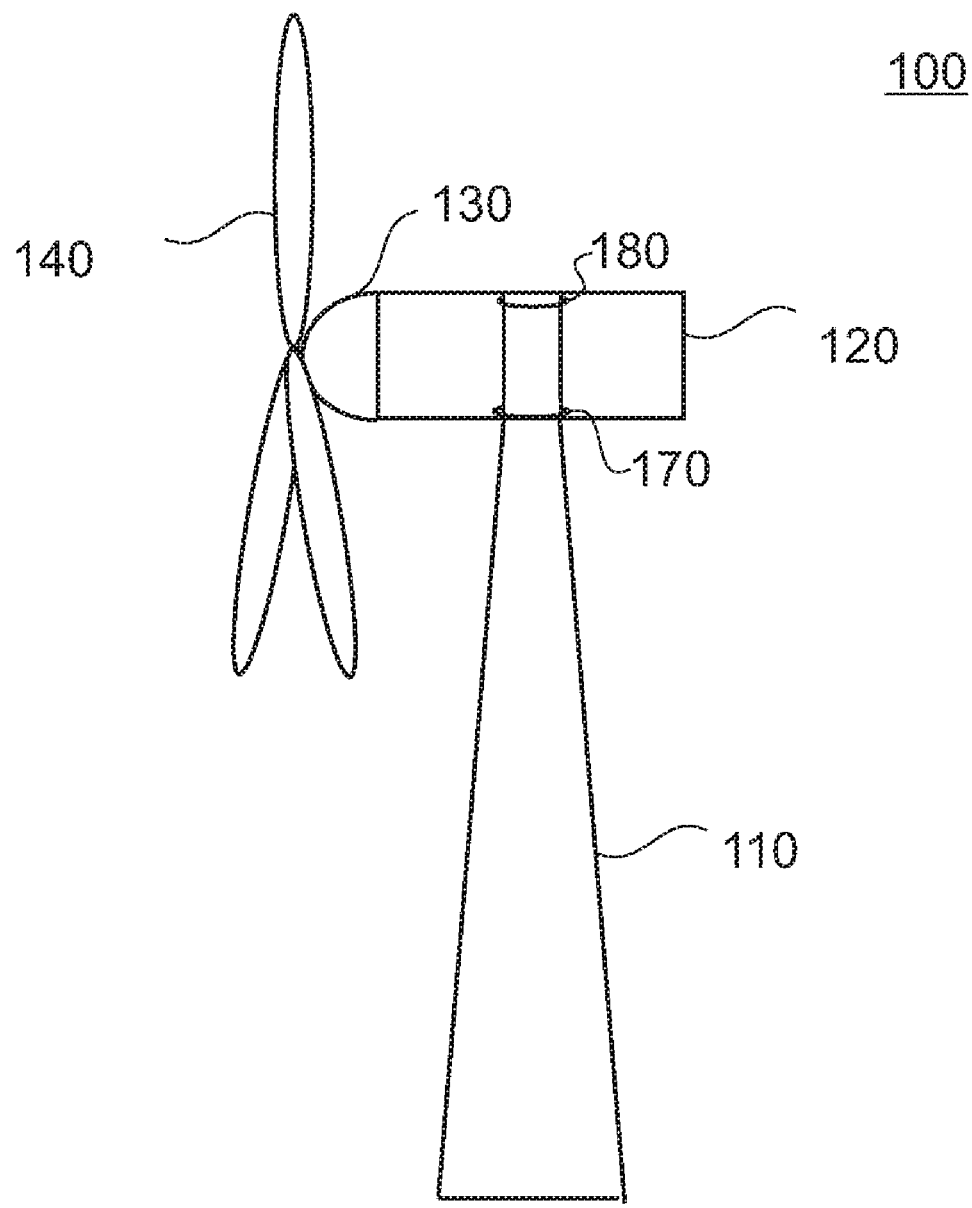
FIG. 2 is a schematic drawing of a wind energy system according to embodiments described herein.

FIG. 2 is a schematic view of a wind energy system 100 according to embodiments described herein. For a better understanding, the body of the machine nacelle 120 is shown transparently in FIG. 2. Furthermore, FIG. 2 shows a lower yaw bearing 170 and an upper yaw bearing 180. The yaw bearings 170 and 180 connect the machine nacelle 120 to the tower 110.

Typical embodiments described herein provide two yaw bearings, namely a lower yaw bearing and an upper yaw bearing. The provision of two yaw bearings shares bending moments on two yaw bearings. The yaw bearings of embodiments described herein are fitted in such a way that no or low additional bending moments are created and that the tower and the main frame structure loads are decreased. Typical embodiments show less eccentric load transfer and show material savings due to reduced loads. The yaw bearings are subjected to lower stress and have a reduced complexity. The likelihood of fatigue failure is reduced due to the reduction of forces and bending moments per yaw bearing. The reduction is mainly obtained by the distance between the two yaw bearings. The connection between the tower and the machine nacelle is made stiffer and more reliable due to the provision of two yaw bearings.

In typical embodiments, the distance between the yaw bearings is at least 50 cm, more typically at least 1 m, even more typical at least 1.5 m. The larger the distance, the smaller are the bending forces acting upon the bearing. Diameters of yaw bearings can be smaller due to smaller forces acting on one yaw bearing. Diameters of yaw bearings according to typical embodiments disclosed herein are smaller than 5.0 m or 4.0 m or 3.0 m. Moreover, diameters of yaw bearings according to typical embodiments disclosed herein are greater than 50 cm or 1.0 m or 1.5 m.

Typical embodiments described herein comprise at least one further yaw bearing. Some embodiments have three yaw bearings, one lower yaw bearing, one upper yaw bearing and one in between the upper and the lower yaw bearing. Typically, the middle yaw bearing is positioned substantially in the middle between the upper yaw bearing and the lower yaw bearing. "Substantially" is typically to be understood as embracing a +/−15% deviation from the arithmetic middle. Three yaw bearings or even more yaw bearings provide stiffer connections between the tower of the wind energy system and the machine nacelle.

In typical embodiments, the hub with the rotor blades is rotating about a horizontal rotation axis. The blades thereby define a plane. It should be noted, that often the blades are not exactly aligned with the "rotor blade plane". Rather, the blades are can be inclined with respect to this plane about a few degrees (approx. 0.5° to 5°) forming an obtuse-angled cone. Typically, the yaw is adapted such that the plane of the rotor blades is aligned perpendicular to the direction of the wind. In embodiments, the rotation axis of the hub with the rotor blades is tilted about some degrees, normally below 10 degrees such as 5 degrees. Herein, the term "essentially horizontal" encompasses an exactly horizontal axis as well as axes which are tilted to a maximum of 8 degrees; 5 degrees; or 2 degrees with respect to a horizontal line.

According to embodiments described herein, one of the yaw bearings is located higher than the axis of rotation of the hub of the wind energy system. The yaw bearing located higher than the axis of rotation is typically the upper yaw bearing. The lower yaw bearing is typically located below the axis of rotation of the wind energy system. This arrangement provides a good split-up of forces acting on the yaw bearings.

Figure 3:
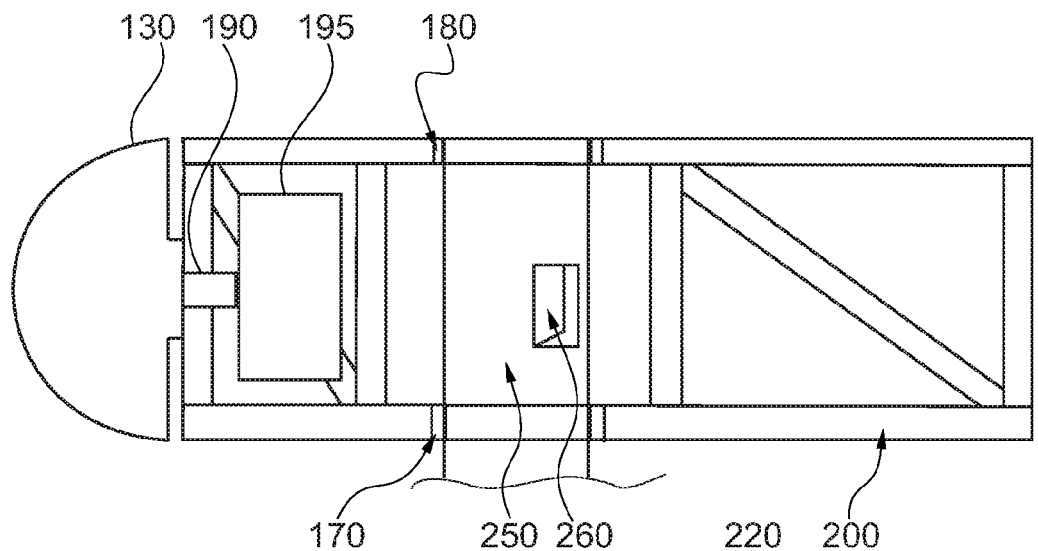
FIG. 3 shows schematically parts of another embodiment of a wind energy system in an elevational view.
Figure 4:
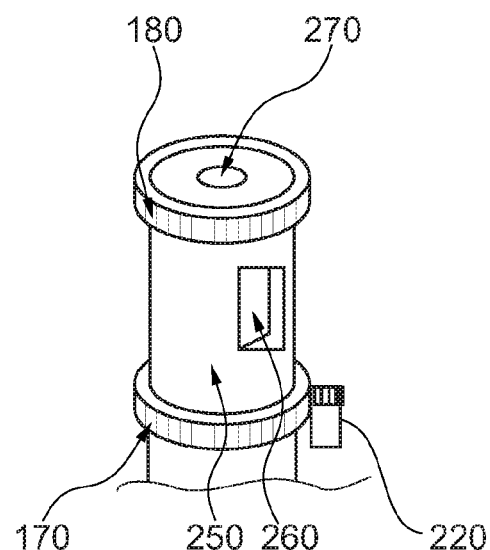
FIG. 4 shows schematically additional parts of the embodiment of FIG. 3 in another view.

FIG. 3 shows schematically parts of a typical embodiment of a yaw bearing and a wind energy system. In FIG. 3, a shaft 190 is shown which connects the hub 130 with a direct drive generator 195. It should be noted that in FIG. 3 many parts have been omitted due to clarity. Some additional parts are shown in FIG. 4, wherein in FIG. 4 no main frame or hub is shown. Therefore, FIGS. 3 and 4 are explained together.

According to embodiments described herein, the shaft is connected to a direct drive generator. Direct drive generators are suitable for machine nacelles with limited space. Direct drive generators do not have a gear box between the hub and the generator. Direct drive generators can easily fit into machine nacelles since no room for a gear box has to be provided.

In other typical embodiments, the shaft is connected to a gear box which is connected to a generator. It is possible to use gear boxes which only need limited space. Other typical embodiments use small-space combinations of a gear box with a generator to reduce the space needed for the gear box and the generator.

The yaw bearings 170 and 180 are connected to a main frame 200, wherein the yaw bearings 170 and 180 are connected to different struts of the main frame 200, namely upper and lower struts. The main frame 200 is part of the machine nacelle (not shown in FIG. 3 for the sake of clarity) and is designed as a framework which is depicted in FIG. 3 in a two-dimensional view. In detail, the machine nacelle is mounted on the outer struts of the main frame 200. The main frame also supports the direct drive generator 195.

According to typical embodiments described herein, the main frame is designed as a framework, like, e.g. frameworks of common railway bridges having struts which are connected at nodes. Most of the struts are arranged in a parallel manner, such that a construction of the main frame is made easy.

In further typical embodiments, the main frame is designed as a space frame with a design optimized to reduce forces in different parts of the space frame. Space frames only have few struts arranged in a parallel manner or even no parallel struts. Space frames have struts which mainly follow the trajectories of forces acting on the space frames.

In FIG. 4, a yaw drive 220 is shown which is in engagement with the lower yaw bearing 170. The lower yaw bearing 170 comprises teeth which are in engagement with teeth of the yaw drive 220. The yaw drive 220 can be used to turn the machine nacelle 120 with the main frame 200 around the tower 110. This allows the hub 130 with the rotor blades 140 to be orientated such that the wind energy system 100 is in an optimal position with respect to the wind direction.

In typical embodiments, one yaw drive is used to align the machine nacelle, the hub and the rotor blades. One yaw drive can be enough for the alignment of the machine nacelle reducing costs of the whole wind energy system. In typical embodiments, a single yaw drive is in engagement with the lower yaw bearing. In further typical embodiments, a single yaw drive is in engagement with the upper yaw bearing. The position of the yaw drive can be chosen in dependence of available space in the nacelle.

In other typical embodiments described herein, two or more yaw drives are used to align the machine nacelle. Two yaw drives reduce the forces which each yaw drive is subjected to. Typically, one yaw drive is arranged close to a respective yaw bearing, e.g. an upper yaw drive for interacting with the upper yaw bearing and a lower yaw drive for interacting with the lower yaw bearing. According to possible embodiments that can be combined with all embodiments described herein, more than one yaw drive is provided per yaw bearing. Yaw drives can e.g. be hydraulic motors or electromotors.

The hub 130 rotates about a horizontal rotation axis. The shaft 150 and the generator 160 are normally aligned with the rotation axis. In the embodiment shown in FIGS. 3 and 4, the wind energy system 100 is configured such that the rotation axis is horizontal.

According to the embodiment shown in FIGS. 3 and 4, the tower reaches through the lower yaw bearing 170. The lower yaw bearing 170 and the upper yaw bearing 180 may be connected by a hollow shaft which is exemplarily shown as hollow shaft 250 in FIGS. 3 and 4. The hollow shaft may be an integral part of the tower 110. Hence, a person can pass through the tower 110 through the yaw bearing 170 to get from the lower part of the tower 110 into the hollow shaft 250.

In typical embodiments, the tower reaches through the lower yaw bearing and ends at the upper yaw bearing. Therefore, the tower forms a hollow shaft between the lower yaw bearing and the upper yaw bearing. Other typical embodiments described herein use a separated hollow shaft and a flange connection between the tower and the hollow shaft. The flange connection is sited at or nearby the lower yaw bearing.

In FIG. 4, the hollow shaft 250 between the lower yaw bearing and the upper yaw bearing comprises an entry door 260 which can be used to enter the nacelle 120 from the tower 110 and the hollow shaft 250. Moreover, the hollow shaft 250 can be entered from the roof of the nacelle 120 by a roof exit hatch 270 which is located at the upper end of the hollow shaft 250 nearby the upper yaw bearing 180.

Typical embodiments described herein comprise an entrance or an entry door in the hollow shaft for entering the nacelle from the tower. An entering of the nacelle is made easy. In other embodiments, a simple opening is used to allow a passing from the tower into the nacelle. Between the hollow shaft and the tower a manhole with a manhole cover can be situated. In other embodiments, the tower simply passes through the lower yaw bearing. Typically, one yaw bearing is positioned above the entrance for entering the nacelle from the tower, and one yaw is positioned below the entrance.

In typical embodiments, inside the tower at the height of the lower yaw bearing struts are provided to stiffen the tower. High forces have to be handled in the area of the lower yaw bearing. Therefore, struts provide for a better guiding of forces from the lower yaw bearing into the tower. Other typical embodiments described herein provide a stiffening plate inside of the hollow shaft to stiffen the hollow shaft at the location of the lower yaw bearing. The stiffening plate may have a man hole.

Typical embodiments comprise a roof exit hatch on top of the hollow shaft or the upper yaw bearing. The roof exit hatch allows an operator to leave the tower and the hollow shaft to get on top of the machine nacelle. Other embodiments have a roof exit located in the roof of the machine nacelle directed away from the hollow shaft. Typical embodiments have an exit located on one of the side walls of the machine nacelle.

Figure 5:
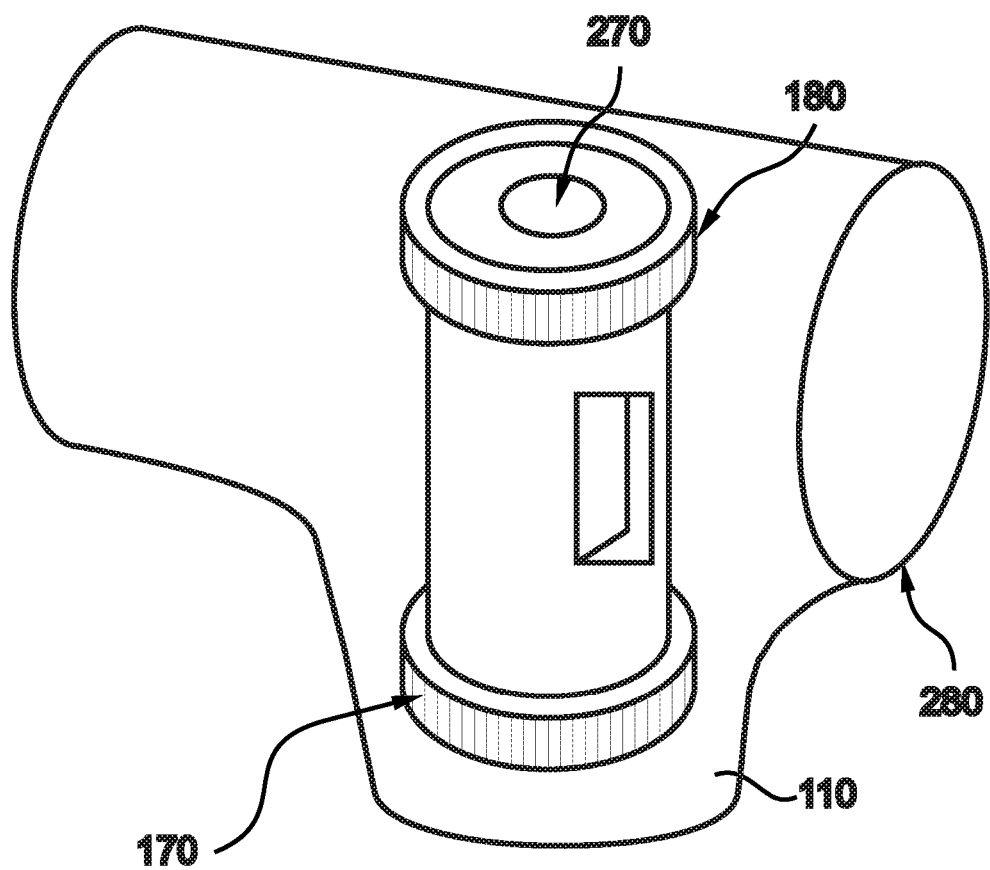
FIG. 5 shows schematically parts of a further embodiment of a wind energy system.

FIG. 5 shows schematically a typical embodiment of a yaw bearing and a wind energy system according to the present disclosure. In FIG. 5, some of the parts shown in FIG. 3 have been omitted for the sake of clarity of the drawing. In detail, the direct drive generator, the shaft connecting the hub to the direct drive generator and some other parts have been omitted.

Figure 6:
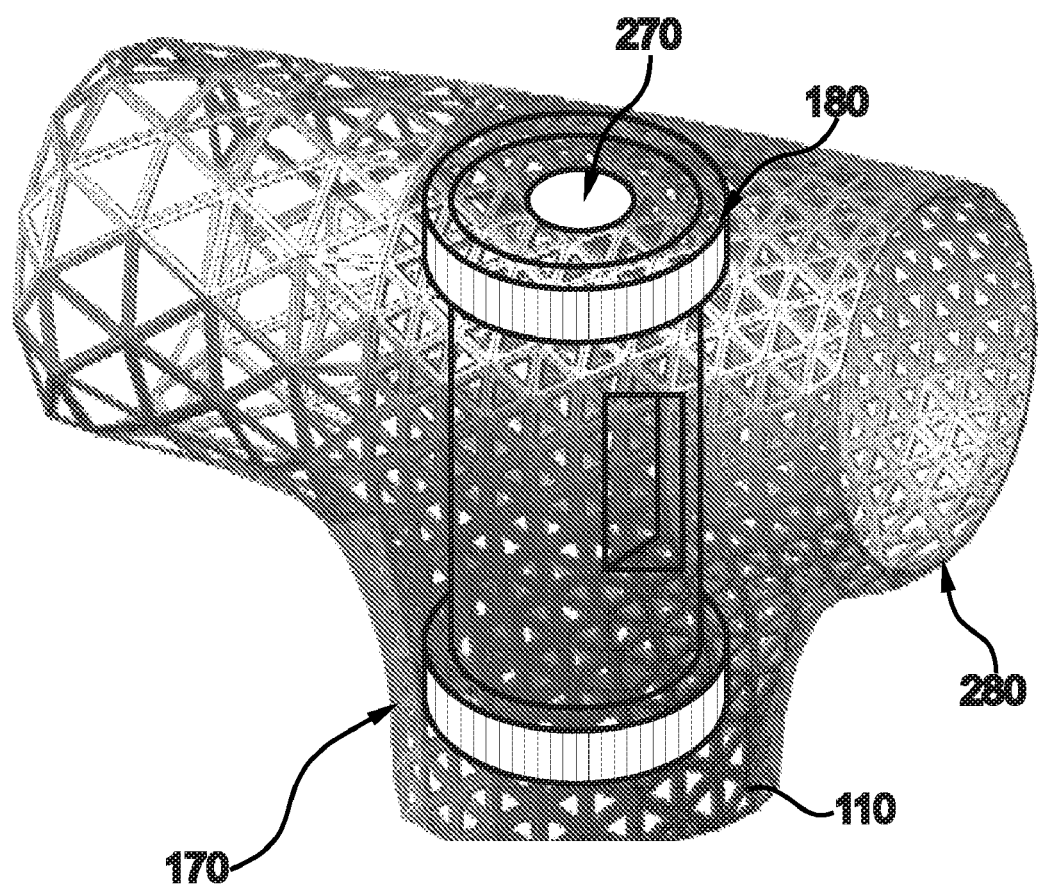
FIG. 6 shows a wire frame model of the parts of the wind energy system illustrated in FIG. 5 according to an embodiment.

The embodiment shown in FIG. 5 differs with respect to the embodiment shown in FIG. 3 in that the main frame of the wind energy system shown in FIG. 5 is designed as a space frame 280. The space frame 280 has several curved struts, such that the outline of the space frame 280 can easily be covered by a shapely hull of the machine nacelle. Moreover, the struts of the space frame 280 are designed for minimal notch stresses reducing fatigue problems. FIG. 5 is a schematical three-dimensional view of a space frame. In FIG. 6, the space frame is illustrated in more detail as a wire frame model. Further, the internally located yaw bearing, hollow shaft and entry door are schematically shown as well in FIGS. 5 and 6.

Typical embodiments comprise a space frame as main frame. Space frames of typical embodiments can provide an improved stiffness. In combination with the two bearings of typical embodiments a greater tower clearance is made possible. A higher tower clearance allows to use less stiffer and hence cheaper rotor blades. Other typical embodiments use three dimensional frames for an improved stiffness.

Figure 7:
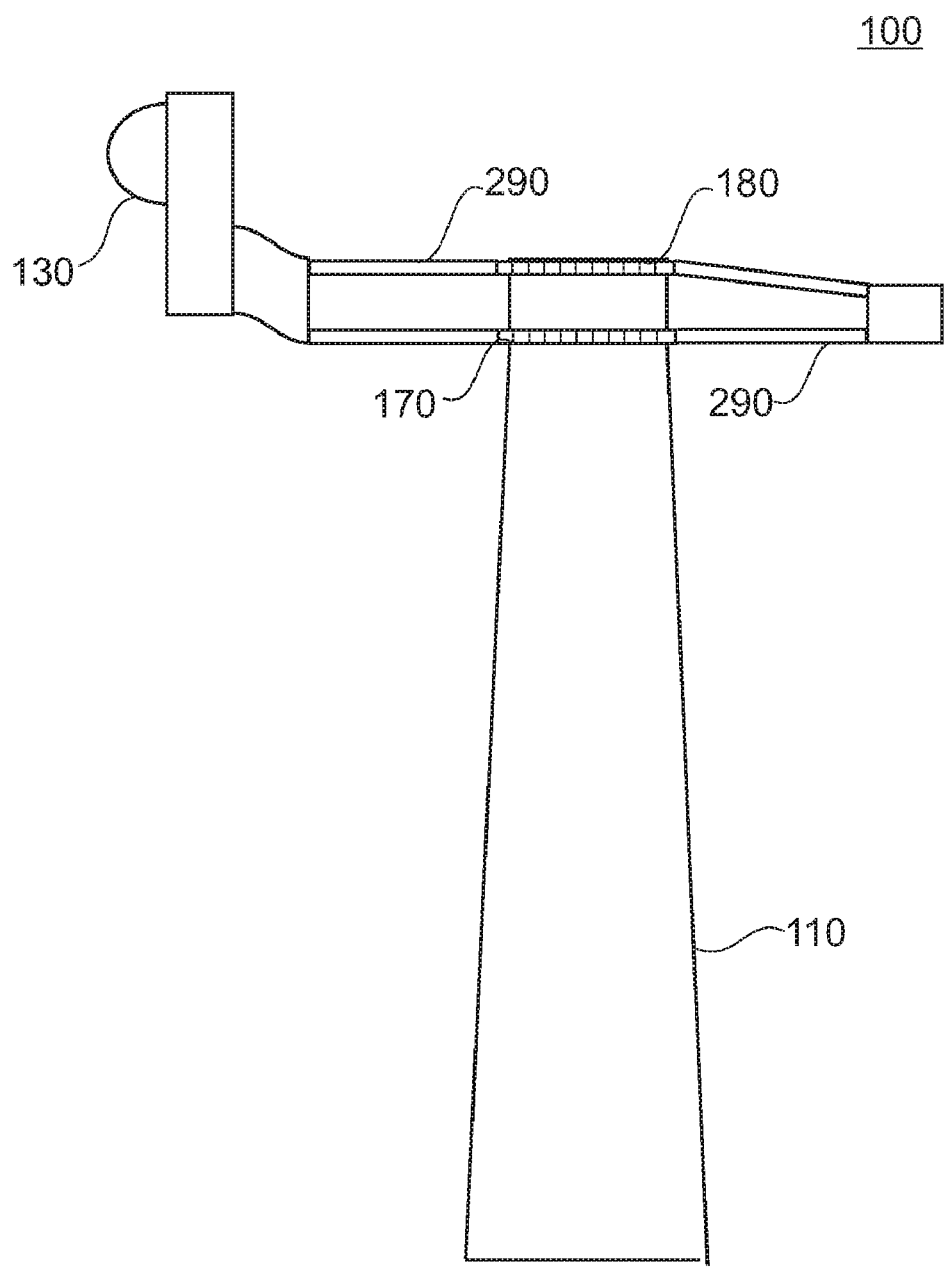
FIG. 7 shows schematically parts of a typical embodiment of a yaw bearing system and a wind energy system according to the present disclosure.

FIG. 7 shows schematically parts of a typical embodiment of a yaw bearing system and a wind energy system according to the present disclosure. The embodiment shown in FIG. 7 comprises a bed plate 290 which is connected by a lower yaw bearing 170 and an upper yaw bearing 180 to the tower 110. The bed plate 290 is adapted to be connected to the lower yaw bearing 170 and the upper yaw bearing 180. Again, in FIG. 7 some parts of the wind energy system 100 have been omitted to show the arrangement of the bed plate 290 and the yaw bearings 170, 180.

Typical embodiments comprise a bed plate which is connected to the tower by two yaw bearings being arranged with a vertical distance of typically at least 20 cm or 50 cm. Further embodiments comprise three yaw bearings connecting the bed plate with the tower.

Figure 8:
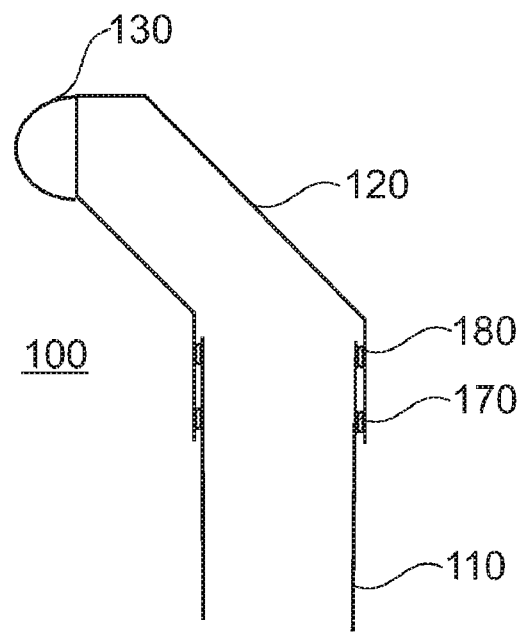
FIG. 8 shows schematically a further embodiment of a wind energy system.

FIG. 8 shows schematically an embodiment of a wind energy system 100. The wind energy system 100 of FIG. 8 is a wind energy system having a forward leaning tower top section. The wind energy system 100 comprises a lower yaw bearing 170 and an upper yaw bearing 180. The distance between the two yaw bearings 170, 180 is between 0.2 m and 1.0 m such as 0.5 m to reduce loads on the yaw bearings 170, 180.

Figure 9:
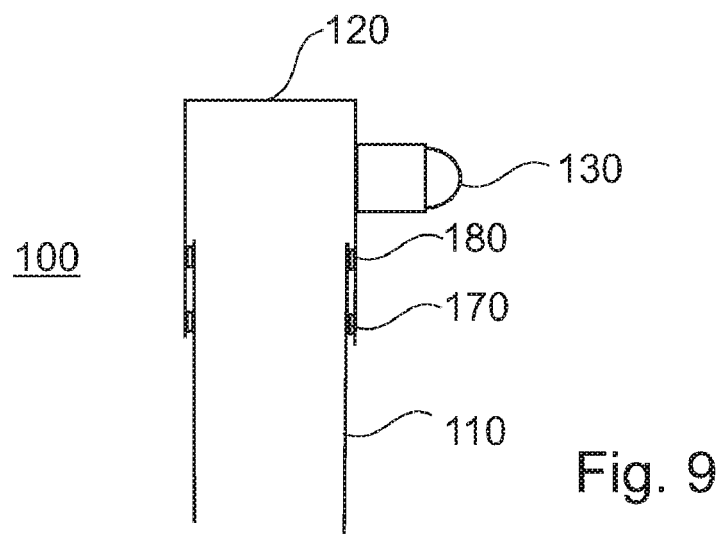
FIG. 9 shows schematically a further embodiment of a wind energy system.

FIG. 9 shows schematically an embodiment of a wind energy system 100. The wind energy system 100 of FIG. 9 comprises a lower yaw bearing 170 and an upper yaw bearing 180. The distance between the yaw bearings is between 0.2 m and 1.0 m such as 0.5 m.

Typical embodiments providing a forward leaning tower top section show a distance between the two yaw bearings of at least 0.5 m. Other embodiments have a distance of at least 1.0 m. A higher distance provides a better split-up of loads.

Typical embodiments provide a forward leaning tower top section. These embodiments have a greater tower clearance. Furthermore, the stiffness of the rotor blades can be reduced or the length of the rotor blades can be increased due to the greater tower clearance. Furthermore, the cone angle can be reduced. Other typical embodiments use nacelles being arranged in a middle position on top of the tower. Generally, typical embodiments provide a possibility of bigger tower clearance due to their yaw bearing system, which is able to handle higher loads and higher bending moments, especially with respect to the tilt axis. Therefore, typical embodiments can be used for increasing the tower clearance to take measures which increase the AEP (annual energy production) of the wind energy system.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wind energy system comprising:
a tower;
a machine nacelle;
a hub mounted to said machine nacelle and being rotatable relative to a substantially horizontal rotation axis;
a lower yaw bearing arranged below said rotation axis, and an upper yaw bearing arranged above said rotation axis;
wherein said lower yaw bearing and said upper yaw bearing are arranged to pivotably connect said machine nacelle to said tower of said wind energy system.

2. The wind energy system according to claim 1, wherein said machine nacelle comprises a main frame, and wherein said lower yaw bearing and said upper yaw bearing pivotably connect said main frame to said tower of said wind energy system.

3. The wind energy system according to claim 1, further comprising at least one yaw drive configured to pivot said machine nacelle relative to said tower.

4. The wind energy system according to claim 3, wherein said at least one yaw drive engages at least one of said upper yaw bearing and said lower yaw bearing.

5. The wind energy system according to claim 1, further comprising at least two yaw drives, wherein one of said at least two yaw drives engages said upper yaw bearing and another of said at least two yaw drives engages said lower yaw bearing.

6. The wind energy system according to claim 1, further comprising at least one additional yaw bearing.

7. The wind energy system according to claim 1, wherein the hub comprises rotor blade.

8. The wind energy system according to claim 7, further comprising a gearbox connected to said hub.

9. The wind energy system according to claim 1, wherein said lower yaw bearing and said upper yaw bearing are connected by a hollow shaft.

10. The wind energy system according to claim 9, wherein said tower continues through said lower yaw bearing, and, wherein said hollow shaft is part of said tower.

11. The wind energy system according to claim 10, wherein said hollow shaft comprises an entrance.

12. The wind energy system according to claim 1, wherein said upper yaw bearing comprises a roof exit hatch.

13. The wind energy system according to claim 1, wherein a distance between said upper yaw bearing and said lower yaw bearing is at least 1.0 m.

14. The wind energy system according to claim 2, wherein said main frame comprises a space frame structure.

15. A yaw bearing system configured to pivotably connect a machine nacelle, onto which a hub rotatable about a rotation axis is mounted, to a tower of a wind energy system, the yaw bearing system comprising:
a lower yaw bearing arranged below the rotation axis; and
an upper yaw bearing arranged above the rotation axis.

16. The yaw bearing system according to claim 15, wherein a distance between said upper yaw bearing and said lower yaw bearing is at least 0.5 m.

17. A wind energy system comprising:
a tower;
a machine nacelle;
a hub rotatably fixed with respect to said machine nacelle; and
at least two yaw bearings,
wherein the tower and the machine nacelle are connected by said at least two yaw bearings, one of said at least two yaw bearings being located higher than an axis of rotation of said hub of said wind energy system.

* * * * *